R. A. BECKWITH.
CYLINDER HEAD CONSTRUCTION.
APPLICATION FILED FEB. 24, 1920.
1,430,051.
Patented Sept. 26, 1922.
2 SHEETS—SHEET 1.
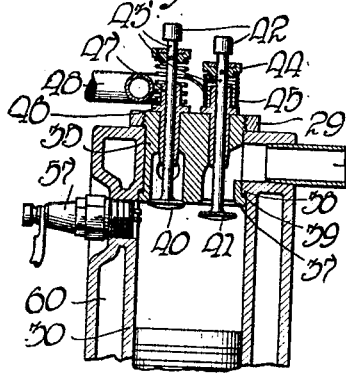
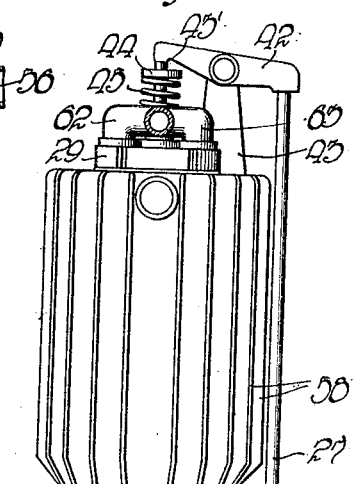
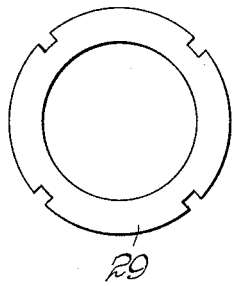
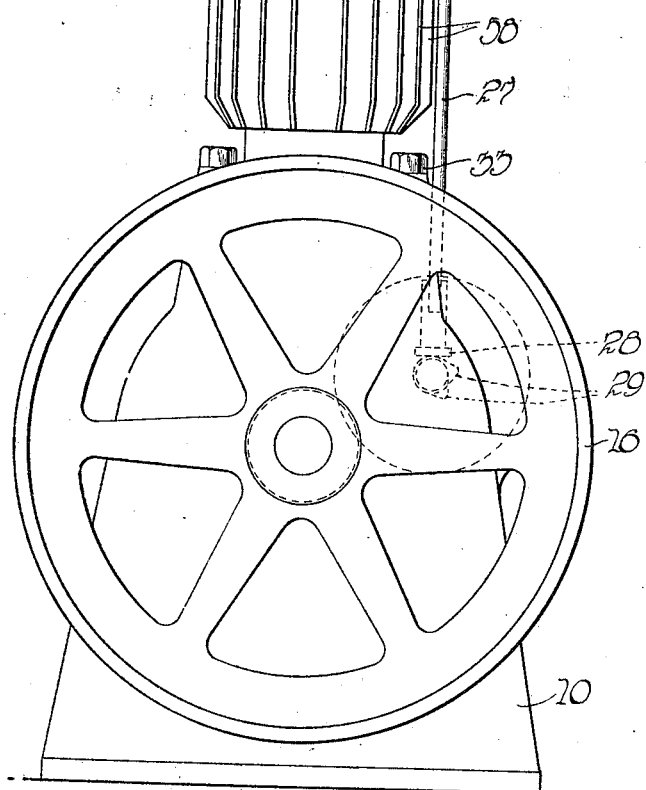
Inventor
Raymond A. Beckwith
By Brown Boettcher Dienner
Attorneys

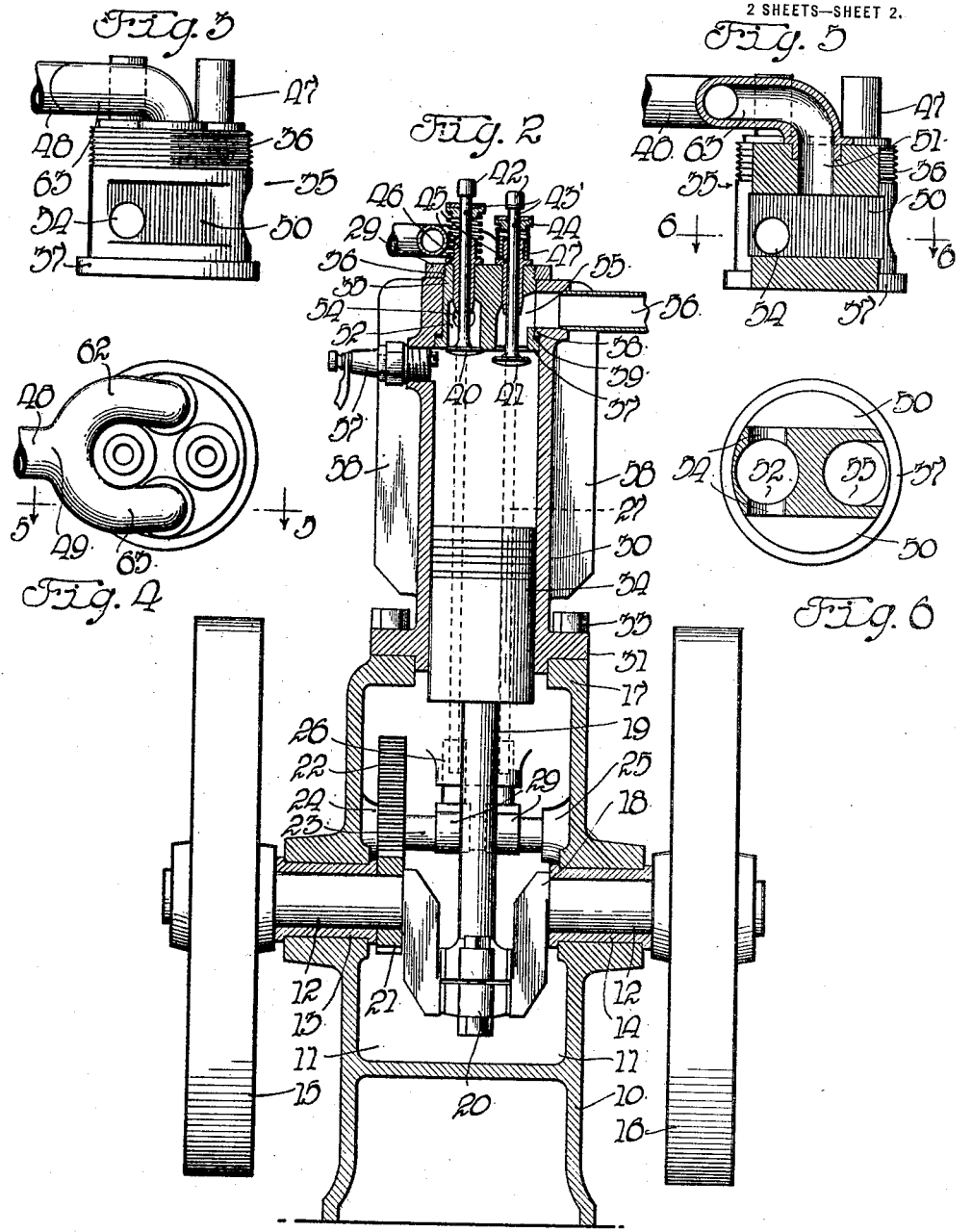

Patented Sept. 26, 1922.

1,430,051

UNITED STATES PATENT OFFICE.

RAYMOND A. BECKWITH, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

CYLINDER-HEAD CONSTRUCTION.

Application filed February 24, 1920. Serial No. 360,716.

*To all whom it may concern:*

Be it known that I, RAYMOND A. BECKWITH, a citizen of the United States, residing at Milwaukee, in the county of Milwaukee and State of Wisconsin, have invented a certain new and useful Improvement in Cylinder-Head Constructions, of which the following is a full, clear, concise, and exact description, reference being had to the accompanying drawings, forming a part of this specification.

My invention relates to improvements in cylinder head construction, and is particularly applicable to internal combustion engines although it is not intended to be directed to such use solely.

Two of the greatest sources of difficulty and trouble in internal combustion engine construction of the ordinary type lie in the necessity for a permanently tight fit of the cylinder head upon the cylinder and the necessity for proper cooling of the head. In water jacketed engines the cylinder head is mounted on the cylinder by means of studs projecting therefrom, and is cooled by a water jacket communicating with the jacket of the cylinder.

In air cooled engines fins are generally formed upon the cylinder and the head. To fasten the head it is necessary to form lugs or enlargements on the walls of the cylinder and mount studs in these enlargements for fastening the head. These lugs or enlargements are objectionable, both because they interrupt the continuity of the fins and because they tend to cause unequal expansion and contraction in addition to requiring excessive metal which is poorly distributed.

In waterjacketed engines there is the additional difficulty of passing the cooling water from the jacket of the walls to the jacketed heads. A gasket between the head and cylinder is necessary and this gasket must be tight for both the internal pressure and for the water of the jacket. When the head is held upon the cylinder by studs or bolts the pressure tends to open the joint. In the case of high pressures the pressure within the cylinder may rise to such a value that the inward pressure of the studs is not great enough to hold the gasket in place with the result that it will leak and then blow out. Particularly is this apt to be true in case the pressure of the studs is not evenly distributed as might be the case where the gasket is not of uniform thickness or the studs have not been drawn up evenly. Considerable care is required to get the studs drawn up evenly. If this is not done the gasket may leak and perhaps blow out at a very moderate pressure. If the studs holding the head are not drilled or tapped perpendicularly to the head it is extremely difficult for even the most careful mechanic to draw down the cylinder head properly upon the end of the cylinder so that danger of leakage or blowing out of the gasket is avoided.

According to my invention, I seat the cylinder head with the pressure within the cylinder so that the greater the pressure, the greater will be the tendency to hold the cylinder head tight. Employment of the above principle permits me to dispense with studs and the objectional lugs or solid parts into which the studs or bolts are threaded in the prior art construction. The cylinder head is not held in position on the cylinder by bolts and studs, but is held thereon by an annular ring nut. In order to prevent upward displacement of the head from the cylinder, an annular flange is provided on the head, which flange bears upon a shoulder on and in the cylinder, and between the flange and shoulder the cylinder gasket is carried. This arrangement permits the pressure to tighten the cylinder gasket upon its seat in accord with the combustion pressure. I am aware that it has been proposed prior to my invention to close a hole for a boring bar in the end of a cylinder having an integral head with a closure which seats with the pressure, but I believe that I am the first to provide a complete head of this character.

This construction permits of certain advantageous arrangements of parts in a manner not heretofore possible. Preferably I form the cylinder of uniform thickness and symmetrical form throughout except at the point where the spark plug enters the cylinder and the exhaust opening. The cooling means on the cylinder that is either the radiating fins in the case of an air cooled engine or the water jacket in a water cooled engine may thus be made continuous and uninterrupted for the full length of the cylinder and past the cylinder head.

In the preferred form of the invention I mount the valves in the cylinder head whereby I can introduce the mixture through the head and lead the exhaust out laterally through the head. As the cylinder with its cooling means runs past the combustion space and fits snugly about the head the head is prevented from getting overheated both by exterior cooling means and also by the incoming mixture or air. The incoming mixture or air is thereby advantageously heated particularly when using kerosene. In addition to the advantages above pointed out, certain others are gained in that the invention secures among others the following advantages.

(a) Allows uniform thickness of cylinder wall around the combustion chamber;

(b) Reduces the material, thereby affording a much lighter construction;

(c) Permits easy assemblage of the head to the cylinder with the cylinder gasket, as the gasket is self-seating from the combustion pressure within the cylinder;

(d) Eliminates the cost of threading and tapping of the studs and complicated coring of the head;

(e) Decreases the number of obstructions to the free flow of air for cooling the cylinder walls and the head.

While the particular embodiment which I shall describe is an internal combustion engine, it is to be understood that the principles of the invention and the broad structural features may be embodied in steam engines, pumps, compressors and other devices employing cylinders for fluid pressures.

In order to apprise those skilled in the art how to construct and practice my invention, I shall now describe in detail one embodiment of my invention, in connection with the accompanying drawings, which form part of the specification.

In the drawings:

Figure 1 shows in front elevational view an internal combustion engine of the air cooled vertical type embodying my invention;

Figure 2 shows the same in vertical cross section, illustrating the manner in which the cylinder head is mounted in the cylinder;

Figure 3 shows an elevational view of the cylinder head;

Figure 4 is a top plan view of the same;

Figure 5 is a cross section taken on the line 5—5 of Figure 4;

Figure 6 is a cross section taken on the line 6—6 of Figure 5;

Figure 7 is a plan view of the cylinder ring, and

Figure 8 is a fragmentary cross section of a modification wherein a water jacket is employed as a cooling medium.

Referring more particularly to Figures 1 and 2 wherein I have illustrated a single cylinder engine of the vertical type, having overhead valve arrangement, the main frame comprises the bed plate 10 and the crank case 11 which carries the crank shaft 12 in the bearings 13 and 14. The crank shaft 12 is provided with the fly-wheels 15 and 16.

The main frame 10 extends above the bearings 13 and 14 and has formed at its upper end the flange 17. Upon this flange 17 is carried the cylinder casting with the cylinder head which will hereinafter be described. The crank 18 of the crank shaft 12 is suitably connected to the connecting rod 19 through the bearing 20. Mounted at one side of the crank 18 is the gear 21 which meshes with the gear 22, which gear 22 is mounted upon the cam shaft 23. The cam shaft 23 is mounted within the crank case 11, the bearings 24 and 25 being formed upon the main frame 10 for the reception of the ends of the cam shaft 23. The main frame 10 also has bosses 26 for guiding the valve push rods 27. The push rods 27 have formed upon their lower ends flat bearing portions 28 which ride upon the cams 29' provided upon the cam shaft 23. It is to be understood that the construction of the above described parts of the engine comprising the crank shaft, cam shaft and carrying frame is not of the essence of my invention. It is to be further understood that internal combustion engines other than the vertical single cylinder overhead valve arrangement type may be employed in conjunction with my invention, as I have shown such an arrangement as only one form of embodiment.

The upper or top surface of the flange 17 is machined to form a true planar top parallel to the axes of the shaft 12 for receiving a cooperating flange 31 formed at the lower end of the cylinder casting 30. The lower or bottom surface of the flange 31 is also machined to form a true planar top, at right angles to the axis of the cylinder which surface seats upon the machined surface of the flange 17 and is suitably held thereto as by means of the capscrews or bolts 33. This arrangement provides for an easy disassembly and assembly of the cylinder casting, and also for ready access to the crank case when desired. The connecting rod 19 is suitably connected with the piston 34, which piston 34 is adapted to reciprocate in the cylinder 30.

Referring particularly to Figure 2, it will be seen that the upper end of the cylinder casting 30 carries the cylinder head 35. The cylinder head 35 is of a cylindrical contour and is adapted to seat part way within the cylinder 30. The upper end of the head 35 is provided with threads 36, which threaded portion projects from the cylinder 30. A spanner or ring nut 29 (see Figure 7) engages the threaded portion 36. The lower end of the head 35 is provided with an annular flange 37, which flange 37 engages a cooperating shoulder 38 of the cylinder 30. The shoulder 38 is formed by boring out the lower portion larger than the upper portion of the cylinder 30. The cylinder gasket 39 is adapted for reception between the annular flange 37 and shoulder 38. It will be noted that by drawing up or tightening the ring nut 29 on the threaded portion 36 of the head 35, an even pressure is applied upon the gasket 39, and consequently a tight fit is obtained. The combustion pressure with the cylinder increases the pressure on the gasket 39 and as a result the pressure on the gasket is always sufficient to secure a tight joint.

The valve arrangement shown is that of the overhead type. The intake valve 40 and the exhaust valve 41 are both carried by and in the cylinder head 35, and preferably lie opposite each other upon a diameter of the head, but it is evident that other various arrangements may be had without entirely departing from the scope of my invention. The valve push rods 27 are suitably fastened to the rocker arms 42, which are preferably carried upon a bracket 43 provided upon the cylinder 30. The other or opposite ends of the rocker arms 42 suitably engage the upper ends of the valve stems 43′ of the intake valve 40 and the exhaust valve 41. Retainer washers 44 secured on the valve stem 43′ serve as abutments for the valve springs 45, which valve springs 45 are confined between the retainer washers 44, and flanges 46 provided upon the valve stem guides 47. The valve stem guides 47 are suitably mounted in the cylinder head 35.

Referring more particularly to Figures 4, 5 and 6, it will be seen that the intake manifold 48 is bifurcated as indicated at 49 into the two passageways 62 and 63 which lie upon a diameter at right angles to the diameter of the valves to secure the best spacing arrangement. While I have shown in the particular embodiment an engine which is adapted to take in by way of the intake pipe or manifold 48 a charge of air and combustible material such as a hydro-carbon, the invention is not limited to the introduction of the fuel through the intake 48, as air alone may be introduced through this intake and the fuel otherwise introduced into the cylinder. Centrally, and in a plane at right angles to the intake valve 40 and exhaust valve 41, the periphery of the cylinder head 35 is milled away at opposite sides to provide depressions which form passageways or chambers 50. A conduit or valve chamber 52 is provided in the head 35 as by drilling or the like and it has communication with the passageways 50, 62 and 63. The valve chamber 52 is provided in the head 35, which chamber 52 provides at the inner face of the cylinder head a valve seat for the intake valve 40. The ports 54 are drilled in the head 35 so as to provide communication with the passageways 50 and valve chamber 52. The mixture or charge of air is thus permitted to flow first through the passageways 50, thereby tending to cool the head 35 before passing through the valve chamber 52. By this construction the droplets or globules of fuel which remain in the mixture unatomized are vaporized before passing into the combustion chamber by coming in contact with the heated walls of the head 35. The exhaust valve chamber 55 formed in the head 35, provides a valve seat for the exhaust valve 41 and has communication with the exhaust pipe or manifold 56 in any suitable manner. When the head 35 is mounted in the cylinder casting 30, the passageways or chambers 50 are closed, which prevents the escape of gases. Ignition is secured in the usual manner as by suitable spark plugs 57 or it may be secured in any preferred manner. In the embodiment shown in Figures 1 and 2 the cylinder is air cooled as by the radiating fins 58, suitably secured to the cylinder casting 30.

The radiating fins or flanges are straight and continuous and not only do they present a much neater appearance, but also they permit of greater efficiency in cooling.

While I have shown the intake as bifurcated and entering two openings 51 and the exhaust as passing laterally out of the head, I may use one of the openings 51 for an exhaust outlet, thereby avoiding taking the exhaust out through the side of the head, but this has the disadvantage of greater heating of the head and of tending to restrict the exhaust passageways.

If so desired, the cylinder 30 may be water cooled and a water jacket may be provided for this purpose. By referring to Figure 8, wherein I have shown such an embodiment it will be noted that the water jackets 60 are provided upon the cylinder casting 30 in any suitable manner. The water jacket openings may extend around the upper end of the cylinder casing 35, so that the inner periphery of the same which comes in contact with the outer periphery of the head 35 may be suitably cooled, thereby regulating the necessary expansion of the head 35, which is caused by the high temperatures of the burning gases. By this arrangement it is not necessary to extend the water jacket 60 over the top of the cylinder head, thereby permitting a lighter and more desirable construction. The heat imparted to the head 35 is dissipated and also carried away by the incoming gases by means of conduction.

Attention is called to the peculiar relation between the intake passageway and the chamber 50 in that the entering portion 51 of the intake passageway is directed downwardly toward the bottom wall of the recess 50, which bottom wall forms a highly heated surface being separated from the bottom surface of the cylinder head by only a relatively small thickness of metal so that the incoming mixture, entering by way of the portion 51, is required to make a sharp turn and enter the transverse passageway 54 in order to pass down through the opening 52 into the combustion chamber past the intake valve. The sharp turn in direction of the incoming gas between the portions 51 and 54 causes liquid particles to be precipitated by inertia upon the heated wall forming the bottom part of the recess 50. This construction of a recess or chamber having a highly heated wall against which the particles of fuel are adapted to be projected by a change in direction of the incoming gases is an important feature of the invention.

It will be understood by the construction herein before explained that in mounting the cylinder head upon the cylinder casting studs are totally eliminated, that the enlargement provided for the reception of the studs, both upon the cylinder casting and cylinder head are done away with, and that the water jacket heretofore necessary to cool the cylinder head is eliminated, as this heat is carried away by the extension of the cylinder water jacket and a part is used to advantage by heating the fuel mixture. The cost of manufacture is also materially reduced.

It will be further noted that due to the position of the cylinder gasket, the pressure tending to seat the same is always greater than any pressure which may act to unseat the same, that the pressure exerted against the gasket is always evenly distributed as there are no studs to cause uneven seating of the gaskets, that the danger of blowing one side of the gasket out is eliminated, and that extra precaution in assembling the head to the cylinder with the gasket is done away with as the gasket is self-seating from the pressure within the cylinder.

I do not intend to limit the invention to any specific embodiment except as described in the appended claims and particularly I do not intend to limit the invention to any specific use to which the cylinder and head may be put nor in the case of an internal combustion engine do I intend to limit the invention to any specific number of cylinders, type of ignition, kind of fuel, pressure of the burning gases, timing or form of the valves or such details as do not directly affect the main idea.

I claim:

1. In combination, a cylinder having a substantially continuous bore, a cylinder head seated with the pressure created in said cylinder and a valve controlled passageway adapted for communication with the substantially continuous bore of said cylinder through said cylinder head.

2. In combination, a cylinder having a shoulder at its upper end and a head seating with internal pressure against said shoulder, said cylinder having a passageway for working fluid above said shoulder and said head having a valve for controlling the movement of the working fluid.

3. In combination, a cylinder having a shoulder at its upper end, said cylinder having walls of substantially uniform thickness below said shoulder and a head seating with internal pressure against said shoulder, said head having valved passageways for the entry and exit of the working fluid.

4. In combination, a cylinder having a shoulder within its length, a head seating with internal pressure against said shoulder, said cylinder having an exhaust passage extending through the cylinder wall above the seat of said head.

5. In combination, a cylinder having two communicating bores of different diameters, a substantially continuous shoulder at the juncture of said bores, the larger of said bores being substantially continuous, a passage leading from the smaller of said bores, a cylinder head seating with internal pressure against said substantially continuous shoulder, said cylinder head having a passage through which communication is adapted to be had between the passage leading from the smaller bore and the substantially continuous larger bore.

6. In combination, a cylinder having a substantially continuous bore terminating in a shoulder, a passageway extending through the cylinder wall beyond said substantially continuous bore and said shoulder, a cylinder head seating with internal pressure against said shoulder, said cylinder head having a valved passageway providing communication between the passageway extending through the cylinder wall and the interior of the cylinder.

7. As a new article of manufacture, a cylinder head having its sides indented to form a pair of chambers, said cylinder head having passages for the entry of the incoming working fluid to said chambers, and a passageway for the exit of said fluid from said chambers.

8. In combination, a cylinder having an internal shoulder, a head seating with internal pressure against said shoulder and a clamping member having a head engaging portion and a cylinder engaging portion for clamping said head in place and a valve in said head.

9. In combination, a cylinder adapted to have a pressure created therein, a valve retaining cylinder head having a valve therein and being seated with the pressure created in said cylinder, and a clamping ring having a threaded cylinder head engaging portion and a flat cylinder engaging portion for clamping said head in place.

10. In combination, a cylinder, a removable head seated in said cylinder and projecting therefrom, a shoulder at the lower end of said head, a cooperating seat provided in said cylinder for said shoulder, and a lock nut threaded upon the projecting portion of said removable head and bearing against the adjacent end of the cylinder to clamp said head in place.

11. In combination, a cylinder having two bores of different diameters joined by a shoulder, a cylinder head member fitted in the smaller bore and having an extending flange engaging the shoulder, a pair of valves for intake and exhaust mounted in said head, said valves being arranged upon one diameter an intake passageway lying upon a diameter at substantially right angles to said first diameter, and an exhaust passageway controlled by the exhaust valve, said latter passageway leading out laterally from the smaller bore.

12. In an internal combustion engine of a valve in the head type, a cylinder, a head having a pasageway for the working fluid, said head being surrounded by the upper end of the cylinder, and a poppet valve mounted in said head for controlling said pasageway, said head having a peripheral shoulder of greater diameter than the body of the head, said shoulder seating with the internal pressure of the cylinder.

13. In combination, a cylinder, a head seating within the upper end of the cylinder, an exhaust passageway through the head and an intake pasageway, part of which lies within the lateral side of the head and is closed off by the cylinder wall when the head is in place in the cylinder.

14. In an internal combustion engine, a cylinder having a larger bore for the working chamber and being adapted to receive a working piston, and a smaller bore at the outer end, said bores being separated by a shoulder, a head having a portion of larger diameter lying in the larger bore and a portion of smaller diameter lying in said smaller bore, said portions having a shoulder cooperating with said shoulder in the cylinder to form a tight joint between the head and cylinder, and air cooled ribs extending longitudinally along the full length of the cylinder for cooling both the working chamber and the head.

15. As a new article of manufacture, a substantially cylindrical engine cylinder head of the valve in the head type, said head having a flange projecting outwardly at its inner end, said head being formed of solid metal with a plurality of passageways therein, one of said passageways being an inlet passageway for the working fluid and the other of said passageways being an exhaust passageway, said inlet passageway serving as a sole cooling fluid passageway for the head, said head having valve ports and valves in said head for said ports.

16. As a new article of manufacture, a substantially cylindrical cylinder head of the valve in the head type, said head having a flange projecting outwardly at its inner end, said head being formed of solid metal with a plurality of passageways therethrough, one of said passageways being an inlet passageway for the working fluid and having a recess or chamber in the head with a highly heated wall with the portions of the inlet passageway so arranged that the incoming mixture tends to precipitate fuel upon said highly heated wall, the other of said passageways being an exhaust passageway, said head having valve ports and valves in the head for said ports.

17. A cylinder head comprising a cylindrical metal block having a laterally extending flange at its lower end, an exhaust passageway leading from the lower end face into the block and laterally therefrom, an inlet passageway leading from the lower end face into the block, a transverse bore intersecting said inlet passageway, grooves in the opposite side walls of the block, said grooves intersecting the outer ends of said transverse bore, and inlet passageways extending from the upper end of the block longitudinally into said grooves.

18. A cylinder head comprising a cylindrical metal block having a sealing flange at its lower end, an exhaust passageway leading from the lower end face into the block and a valve controlling said exhaust passageway, an inlet passageway leading from the lower end face into the block, a transverse bore communicating with said inlet passageway, a groove in one side wall of the block, said groove intersecting the outer end of said transverse bore, and an inlet passageway extending from the upper end of the block longitudinally into said groove.

19. A cylinder head comprising a cylindrical metal block having a sealing flange at its lower end, an exhaust passageway leading from the lower end face into the block and a valve controlling said exhaust passageway, an inlet passageway leading from the lower end face into the block, a transverse bore communicating with said inlet passageway, a groove in one side wall of the block, said groove intersecting the outer end of said transverse bore, and an inlet passageway extending from the upper end of the block longitudinally into said groove, and a cylinder, the side walls of which cylinder form a side wall of said recess.

20. A cylinder head having a bottom surface forming part of the combustion chamber, a recess or chamber having a heating surface separated by a relatively thin wall from said bottom surface, an inlet passageway having one portion extending from said bottom surface upward through the metal of the head and entering the recess or chamber laterally above said heating surface, the outer end of the inlet passageway entering said recess or chamber from a different direction and lying out of register with the first portion of the inlet passageway.

21. A cylinder head having a bottom surface forming part of the combustion chamber, a recess or chamber having a heating surface separated by a relatively thin wall from said bottom surface, an inlet passageway having one portion extending from said bottom surface upward through the metal of the head and entering the recess or chamber laterally above said heating surface, the outer end of the inlet passageway entering said recess or chamber from a different direction and lying out of register with the first portion of the inlet passageway, and an inlet valve in said head and an exhaust passageway through the head for heating portions of said head.

22. A cylinder head having a bottom surface forming part of the combustion chamber of the engine, a recess or chamber having a heating surface separated by a relatively thin wall from said bottom surface, an inlet passageway having one portion extending from said bottom surface upward through the metal of the head and entering the recess or chamber laterally above said heating surface, the outer end of the inlet passageway entering said recess or chamber from above and lying in position to discharge fuel particles upon the heating surface, said chamber having a removable wall.

In witness whereof, I hereunto subscribe my name this 19 day of February, 1920.

RAYMOND A. BECKWITH.